United States Patent

Meilander

[15] 3,668,403

[45] June 6, 1972

[54] METHOD AND APPARATUS FOR VEHICLE TRAFFIC CONTROL

[72] Inventor: Willard C. Meilander, Kent, Ohio

[73] Assignee: Goodyear Aerospace Corporation, Akron, Ohio

[22] Filed: May 5, 1969

[21] Appl. No.: 821,618

[52] U.S. Cl....................235/150.23, 343/5 DP, 343/112 C, 343/112 CA
[51] Int. Cl......................................................G06f 15/48
[58] Field of Search............343/5 DP, 7 ED, 112 C, 112 CA; 235/150.23, 150.24

[56] References Cited

UNITED STATES PATENTS 3,178,704  4/1965  Moore et al...................235/150.23 X

OTHER PUBLICATIONS

Eddey, E. E. " The Use of Associative Processors in Radar Tracking and Coorelation," Proceedings of the National Aerospace Electronics Conference, 1967

Primary Examiner—Eugene G. Botz
Assistant Examiner—R. Stephen Dildine, Jr.
Attorney—J. G. Pere and L. A. Germain

[57] ABSTRACT

A method for vehicle traffic control is provided which is basically adapted to aircraft and includes a method for aircraft control to eliminate hazardous operating conditions, a method for determining a potential conflict between two or more aircraft in sufficient time to effect correction, a method for determining an effective maneuver to avoid collision, a method for predicting control sector overload, a method for predicting terminal overload, and as a result of conflict, determination of an alternate flight plan or necessary time delay in takeoff to minimize flight costs. The means to accomplish these methods is a sophisticated data processing system properly programmed to a previously prepared algorithm. Preferably, the invention contemplates use of an associative processor so that all calculations can be performed on each aircraft or vehicle simultaneously in parallel. The invention also contemplates a satellite position measuring system to determine conflict of aircraft or surface vehicles over large water expanses. In addition, the system contemplates determining if a given flight path may intersect hazardous weather, or that an aircraft has safe minimum terrain clearance as the system can provide command instructions or controls in accordance with the system information generation.

17 Claims, 14 Drawing Figures

INVENTOR
WILLARD C. MEILANDER
BY:
Oldham & Oldham
ATTORNEYS

FIG.-9

| STEP | FUNCTION | | | | |
|---|---|---|---|---|---|
| 3 | $a_i = \dfrac{\dot{Y}_i}{\dot{X}_i}$ | $a$ | | | |
| | $b_i = Y_i - a_i X_i$ | $a$ | $a_i x_i$ | | |
| | | $a$ | $b$ | | |
| 5 | $\lvert a_i - a_T \rvert$ | $a$ | $b$ | $a_i - a_T$ | |
| 6 | $x_{c_i} = \dfrac{b_T - b_i}{a_i - a_T}$ | $a$ | $b$ | $a_i - a_T$ | $b_T - b_i$ |
| | | $a$ | $b$ | $a_i - a_T$ | $x_{c_i}$ |
| 7 | $t_{T_i} = \left\lvert \dfrac{x_{c_i}\ x_T}{\dot{x}_T} \right\rvert$ | $a$ | $b$ | $x_{c_i} - x_T$ | $x_{c_i}$ |
| | | $a$ | $b$ | $t_{T_i}$ | $x_{c_i}$ |
| 11 | $t_i = \left\lvert \dfrac{x_{c_i}\ x_i}{\dot{x}_i} \right\rvert$ | $a$ | $b$ | $t_{T_i}$ | $x_{c_i} - x_i$ |
| | | $a$ | $b$ | $t_{T_i}$ | $t_i$ |
| 15 | $\lvert t_{T_i} - t_i \rvert$ | $a$ | $b$ | $t_{T_i}$ | $t_{T_i}\ t_i$ |

FIG.-12

INVENTOR
WILLARD C. MEILANDER
BY:
*Oldham & Oldham*
ATTORNEYS

INVENTOR
WILLARD C. MEILANDER
BY:
Oldham & Oldham
ATTORNEYS

METHOD AND APPARATUS FOR VEHICLE TRAFFIC CONTROL

The annual number of midair collisions has almost doubled in the last two years. This is true of military as well as commercial aircraft. To meet this alarming increase, plans are in progress to provide automatic conflict prediction. However, the current approach involves placing rather extensive and expensive equipment aboard each aircraft. This costly approach may become a necessity if the single alternative is a conventional sequentially oriented ground-based radar data-processing system. For every radar scan in a ground-based system, effective control would require that position, speed, and direction of every aircraft detected be processed sequentially with respect to a large number of other aircraft within the surveillance range of a given radar. Even with the fastest computers presently available, the sequential approach would immediately place a relatively low limit on the number of aircraft that could be handled.

Therefore, as a general object, the invention contemplates solving the air traffic control problem by utilizing an associative processor which is a digital processor capable of performing common arithmetic or logical operations on all words in its memory simultaneously, compared with the conventional digital processor performance of one operation on only two words at one time. With the parallel arithmetic capability provided by the associative processor, ground-based automatic conflict prediction becomes feasible and compatable with existing air traffic control facilities.

The invention has a further object to provide collision avoidance maneuvering techniques, conflict prediction across sector boundaries, and all this being accomplished automatically and simultaneously by the data processing system.

Essentially, the aforesaid objects of the invention and other objects which will become apparent as the description proceeds are achieved by providing a method for effecting vehicle collision avoidance which comprises the steps of determining continuous vehicle position information rapidly for vehicles within a predetermined area with respect to a predetermined reference, computing course and speed for all vehicles on the basis of repeated position information for all vehicles, determining course intersect position and time for all vehicles to each other with respect to a predetermined reference, comparing all vehicle intersect times to a predetermined standard, and sending maneuvering instructions to all vehicles having intersect times within the predetermined standard so as to extend the intersect times outside the predetermined standard.

For a better understanding of the invention, reference should be had to the accompanying drawings wherein:

FIG. 9 illustrates a typical program that may be utilized to generate the predicted positions of aircraft simultaneously in the tracker section of FIG. 2;

Figure 11:
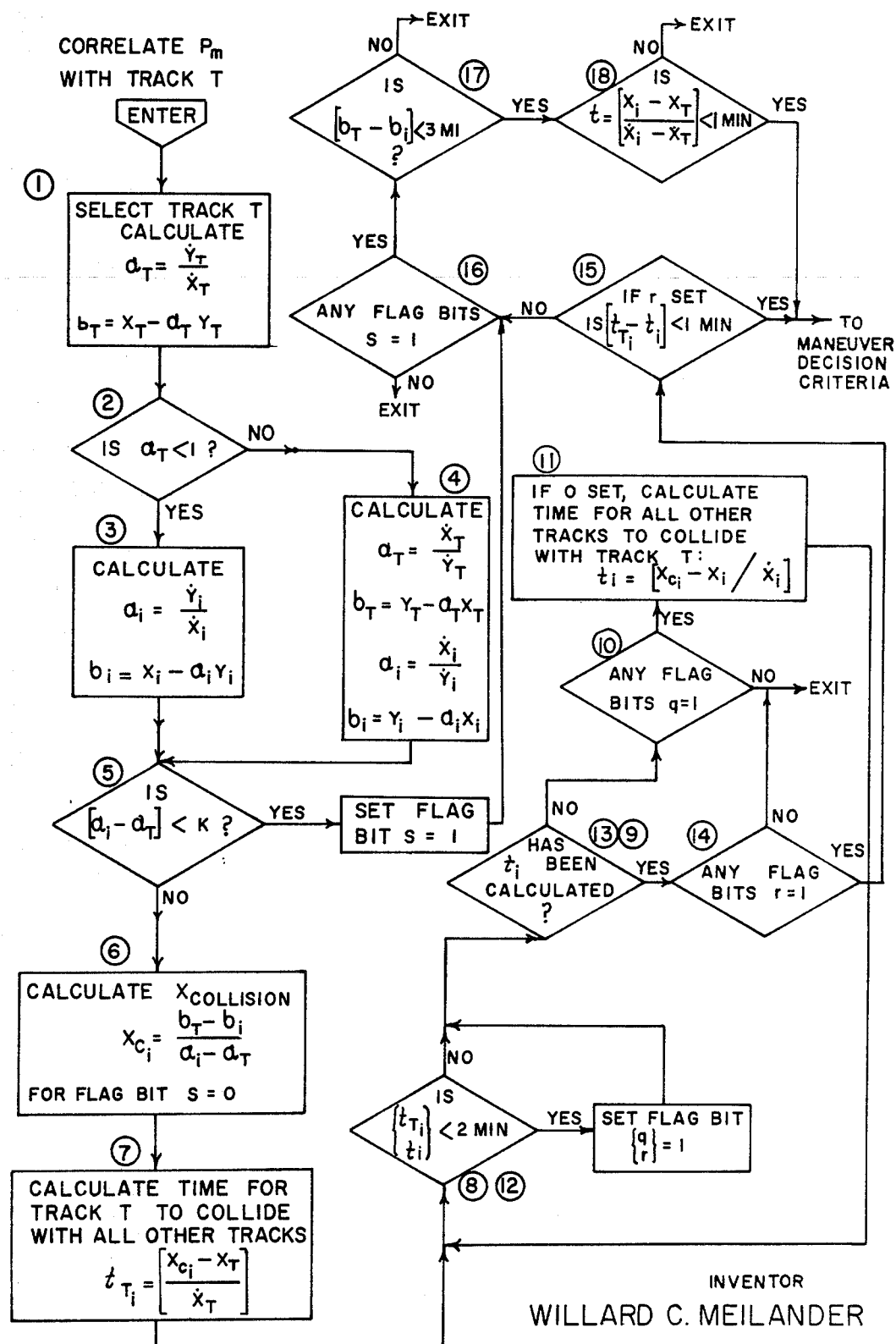
FIG. 11 is an algorithm of a collision solution utilizing the flight path vector evaluation of FIG. 10.
Figure 14:
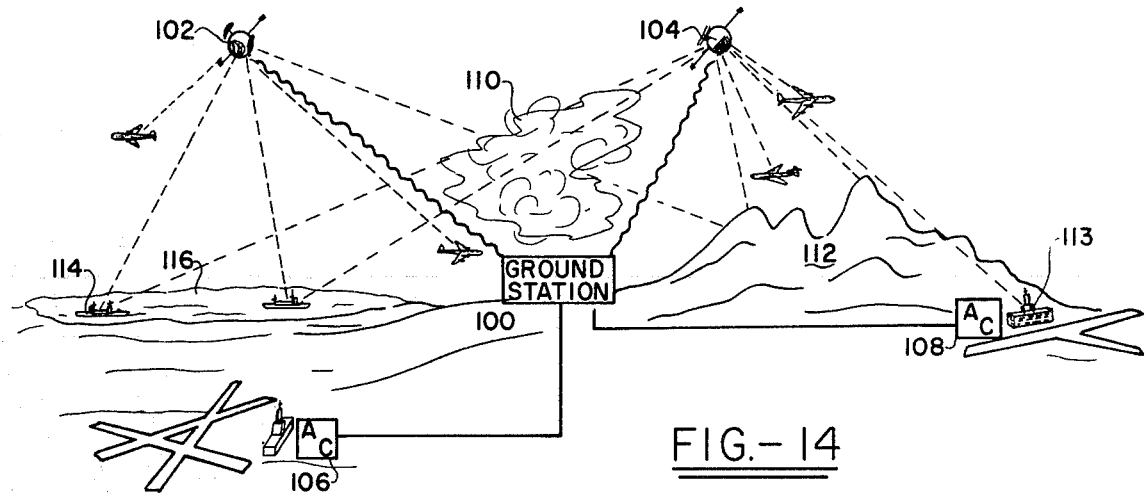
Figure 13:
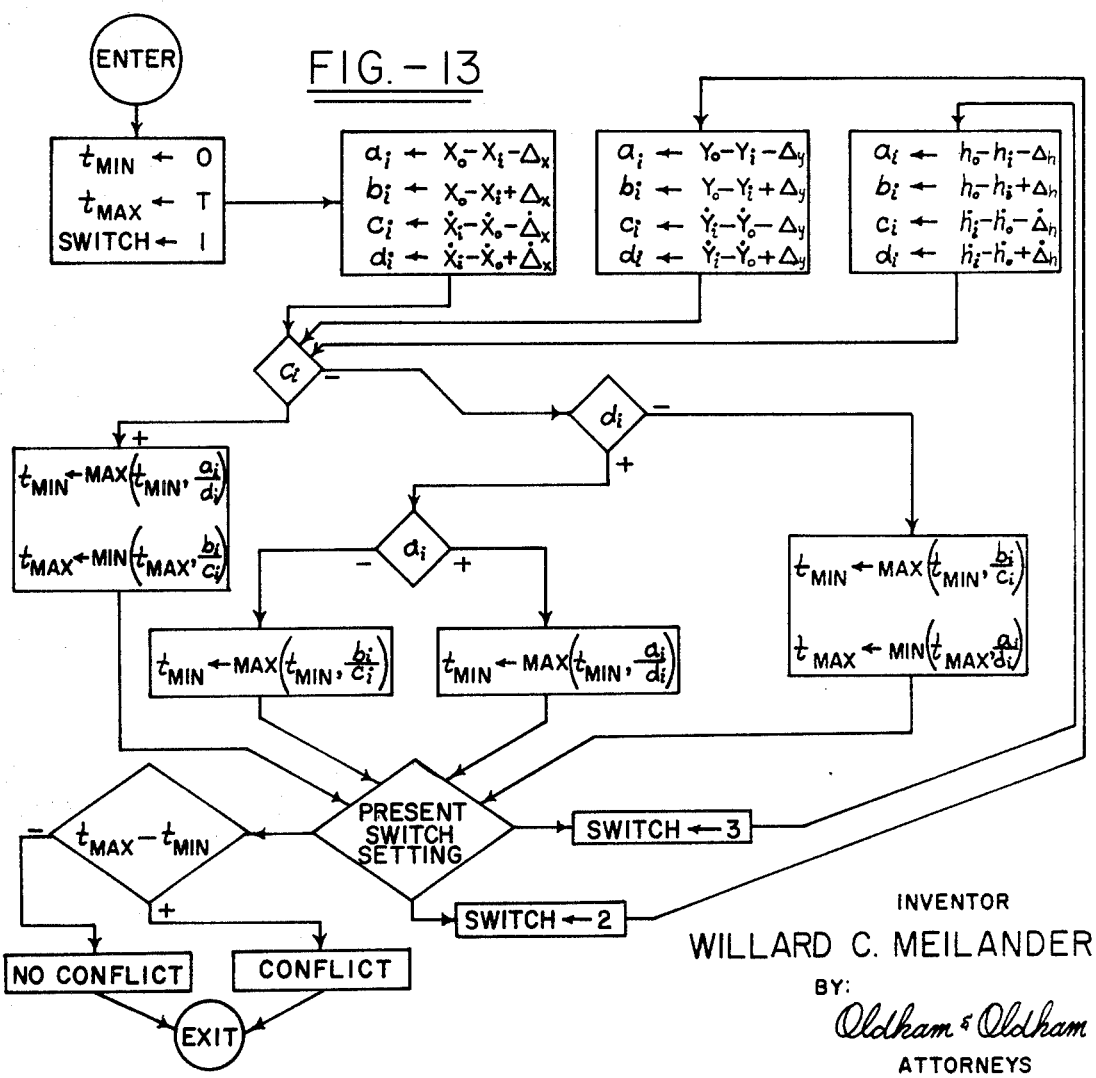

FIG. 12 illustrated the buildup of an associative processor word structure necessary to implement the algorithm of FIG. 11;

FIG. 13 is an example of another algorithm to solve the collision avoidance problem determining a controlled space zone around each vehicle; and FIG. 14 is a block diagram schematic illustrating a typical system implementation and the type of collision avoidance or vehicle control that can be accomplished.

Figure 1:
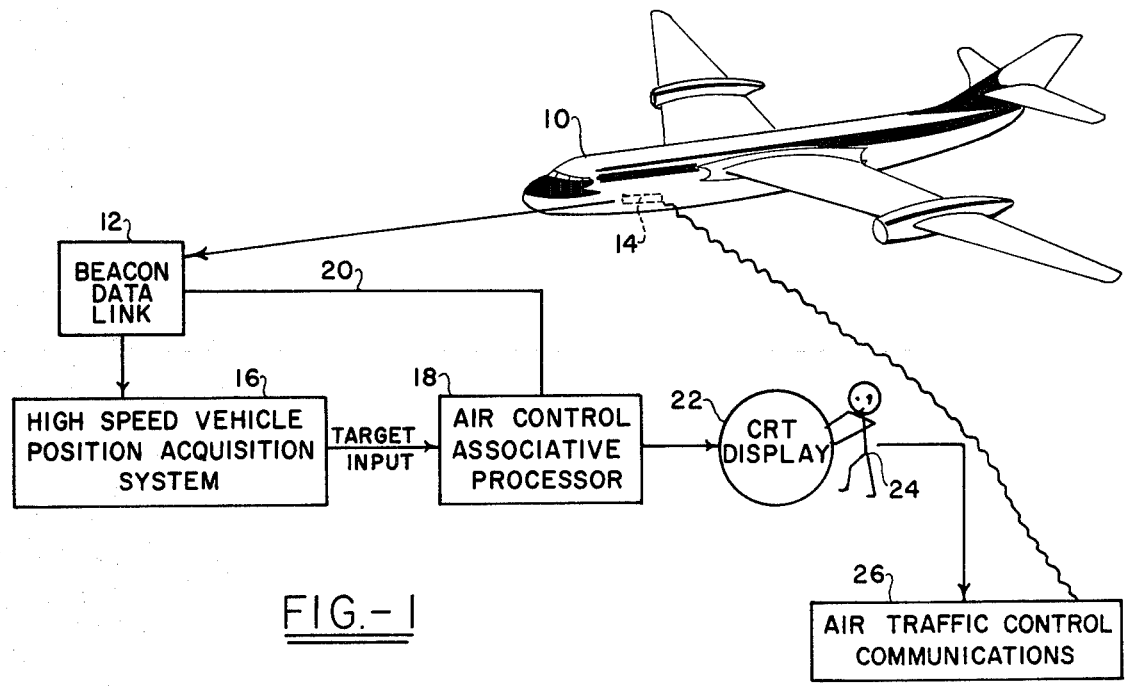
FIG. 1 is a block diagram schematic of the overall system concept showing the major components.

Essentially, the general approach to the problem is illustrated in FIG. 1. Here, an aircraft is illustrated by numeral 10, and position information of the aircraft is generated by a beacon data link 12 cooperating with a beacon receiver and transmitter 14 on the aircraft 10. The data link 12 may be ground-based, aircraft-based or satellite-based, as the need demands. The beacon data link 12 is merely one illustration of the means to obtain aircraft position information, and the invention contemplates that any suitable method to obtain this information will meet the objects of the invention. In any event, the information from the data link 12 is sent to a high speed vehicle position acquisition system 16 which can be of the type illustrated and defined in my co-pending patent application entitled "HIGH SPEED POSITION ACQUISITION SYSTEM AND METHOD," filed May 1, 1969, with Ser. No. 821,028. Again, the invention contemplates that any suitable high speed position information generation system will meet the objects of the invention, and the system described in my co-pending application is merely one practical example.

The target position information is then provided as an input to an air traffic control associative processor indicated generally by block 18. The associative processor 18 may automatically provide information to be transmitted to aircraft 10 over line 20 through the beacon data link 12. Also, the associative processor will drive a CRT display 22. The CRT display 22 can be broken down into an actual situation display and/or a query display as is well known to those skilled in the art. In any event, a skilled human operator 24 is watching and expertly appraising the situation shown on the display 22, and making judgments, if necessary to send instructions or information by voice or digitally via an air traffic control communications channel 26 or the beacon data link 12 to the aircraft 10 by radio transmission. Thus, it should be seen that the invention contemplates that information may be sent automatically to the aircraft 10 from the associative processor 18, or may be sent by the aircraft controller 24 over his communications network 26. The invention contemplates that information automatically sent to the aircraft might be to control appropriate indicators on the instrument panel of the aircraft to indicate potential collisions, suggested course and/or speed changes to avoid the collision, and an indication of the time to collision, as well as the direction from which the potentially colliding aircraft is approaching. The pilot would not necessarily have to act on this information, but it would be available for visual observation in front of him. The information will not automatically control the aircraft, unless in some cases this might be deemed desirable. In any event, the invention contemplates that the controller 24 will have primary control of the situation, and that he can also evaluate the information generated by the processor 18 as presented on his display 22.

Figure 2:
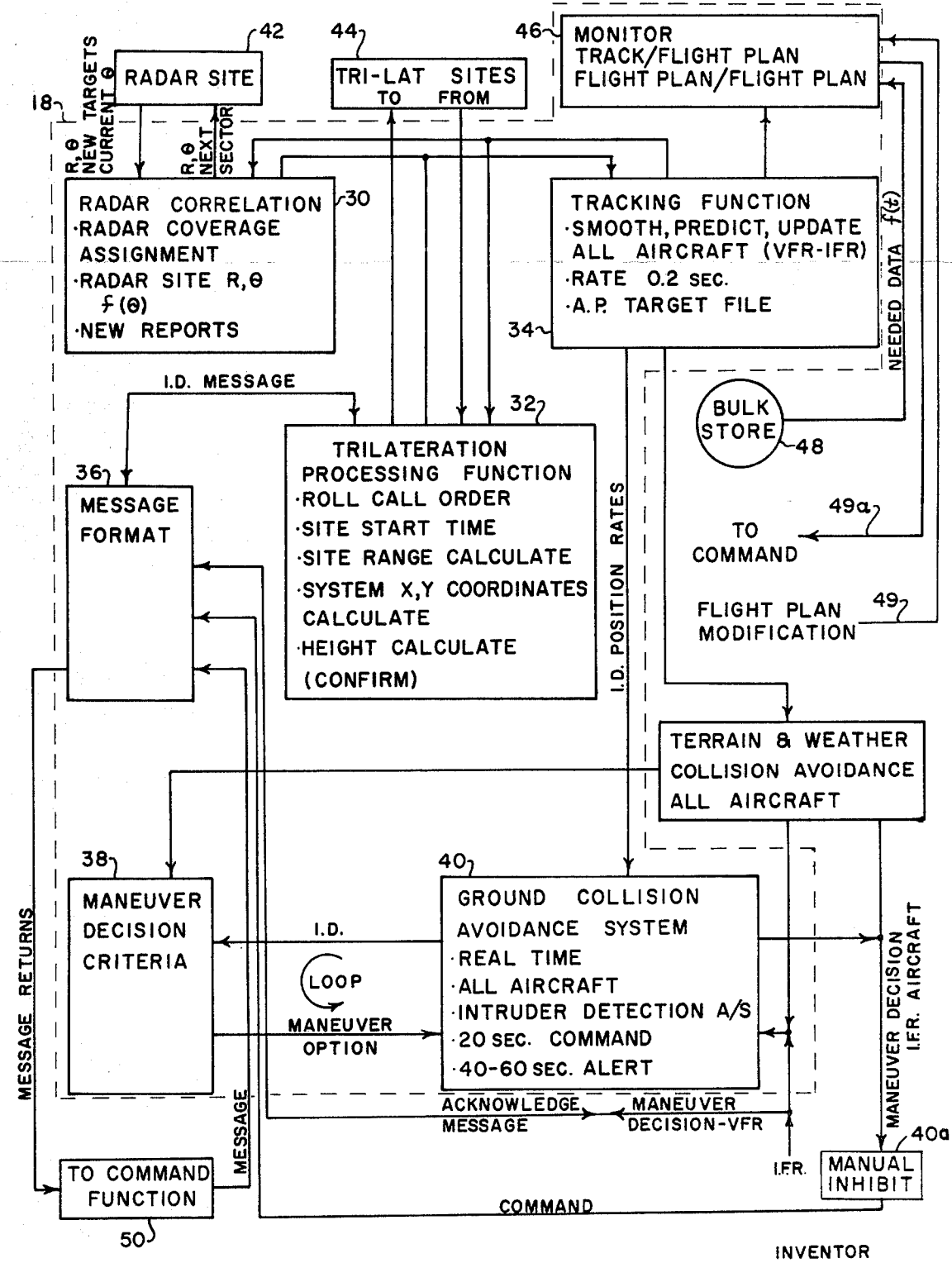
FIG. 2 is a block diagram illustration of the basic components of the associative processor of FIG. 1 adapted to achieve the solution to the air control problem.

The overall arrangement of the data processor 18 is indicated in general block diagram form in FIG. 2. The processor 18 is indicated by the large dotted block in FIG. 2, and the functions performed within the processor 18 are indicated by the respective blocks indicating radar correlation 30, trilateration processing 32, tracking 34, message format 36, maneuvering decision criteria 38, and ground collision avoidance 40. The interrelating arrows between blocks 30 through 40 indicate the information flow in the processor, all of which will be more fully explained hereinafter. The remaining components of the system include radar sites 42 cooperating with the radar correlation section 30. Trilateration sites 44 cooperate with the trlateration section 32. A monitor track/flight plan section 46 forming a part of the data processor 18 cooperates with information received from the tracking section 34 in combination with a bulk store 48 containing flight plan information. A command function section 50 cooperates with the message format section 36 to effect a data link between the control system and the vehicles being controlled.

In the preferred embodiment of the invention, $x$ $y$ and $h$ position information on aircraft is generated from the information provided by the trilateration sites 44 to the trilateration processing section 32. As described in my above-identified application, section 32 effects a roll call order according to range, indicates site start time for respective sites to prevent overlap, and effects ordering on the basis of site range calculations for each site with respect to the aircraft associated with the site. The section 32 also confirms the altitude sent from each aircraft by calculation to determine whether altimeters are functioning properly.

The identifying $x$, $y$ and $h$ position information is sent from section 32 into a tracking section 34 which functions to smooth, predict and update all aircraft tracks, both those operating under VFR and IFR conditions at a repetitious rate, selected to be, for example, every 0.2 seconds. The tracking section 34 looks for consistency in the signals received from section 32 indicating a smooth track of an aircraft, rather than false target information, or erroneous sporatic signals caused by noise, or the like. The target updating information is provided at between 0.2 to 3 second intervals based on predicted position as computed by the section 34, regardless of how frequently actual position is determined based on the trilateration section 32 or the radar correlation section 30. Normally, actual position measurement by either of the sections 30 and 32 will be made on intervals of between about 0.2 to about 10 seconds. The smoothing, prediction, and updating by section 34 can be done by any suitable mathmatical solution adapted to simultaneous calculation by parallel operation of the associative processor 18. Conventional systems have difficulty doing this in short periods of time for large numbers of aircraft, and hence this is where the practical necessity of the associative processor is extremely important.

The tracking section 34 also receives input information from the radar correlation section 30, and likewise provides identify and position information in the $x$, $y$ and $h$ coordinates for both sections 30 and 32. The reason for providing the identify and position information to sections 30 and 32 is so that particular known targets can be interrogated at each trilateration site 44, and so that targets being interrogated by the trilateration system can be ignored at radar sites 42 after processing data through radar correlation section 30.

The purpose of the radar correlation section 30 is to detect those targets that don't respond to the trilateration sites 44. These would be targets that are not cooperating because they don't have a beacon system, or their system is not functioning properly, or they are unfriendly aircraft, etc. The radar correlation section provides in accordance with each respective radar site 42 a respective radar coverage assignment dependent upon the terrain, and the actual functional operational characteristics of the radar from each particular site. Each radar site reports target range and bearing. This information is determined for all contacts not indicated as being detected by the trilateration sites 44. Essentially, conventional radar systems are utilized with the systems being assigned particular areas, as defined above, depending upon terrain characteristics. The area definition is programmed into the correlation section 30 and in effect section 30 decides the radar from which to accept a report, and which radar will back up the reporting radar, and how long a period must expire before backup is necessary. If conventional sweep radar is utilized, adjacent radar sites may have to detect that conical area above each respective radar site which cannot be swept by the conventional radar equipment. The elimination of targets already detected by the trilateration sites 44 is easily accomplished in the associative processor by the identify and position information in $x$, $y$ and $h$ sent from the tracking section 34 to simply tell the correlation section 30 that targets do exist at such and such specific coordinates and to ignore any targets which are detected at those coordinates because they have already been detected. Thus, the radar correlation section 30 will only detect targets that have not been previously detected by the trilateration sites 44 and processed by the trilateration section 32.

Radar correlation and detection techniques are well known to those skilled in the art such as the Navy's NTDS system for utilization over water with ships or the SAGE system utilized by the Air Defense Command. However, these systems operate with conventional computing techniques, and hence do not utilize the parallel processing possible with the associative processor contemplated by the invention, and hence a large number of targets and the time of handling the information cannot nearly equal that contemplated by this invention.

COLLISION AVOIDANCE DETECTION

All target information is passed to the tracking section 34 and hence all target tracks are predicted and continuously updated and transferred to the ground collision avoidance section 40 as well as to monitor 46, which will be more fully explained hereinafter. The ground collision avoidance system 40 effects determination as to whether potential collisions exist or not for all aircraft in real time by an algorithm used in programming and defined more completely hereinafter. The system also determines if conflicts may exist if vehicles turn in a certain direction, and sends instructions not to turn. This detection also includes intruder detection which is of aircraft intruding airspace in which they are not authorized to operate as defined by the processor 18. The section 40 provides 20 second command maneuvering devision information to be sent via the message format section 36 to the respective aircraft indicating direction of maneuver that should be taken to avoid conflict with this being preceded by a 40 to 60 second alert indication that may include instructions intended to prevent aircraft maneuvers that might increase the possibility of collision in the aircraft for which potential conflict exists. The maneuver decision for IFR aircraft may be sent through a manual inhibit 40a controllable by an air controller while the maneuvering decision for VFR aircraft may be sent directly to the message format section 36 for direct transmission to the VFR aircraft.

The ground collision avoidance system section 40 operates in conjunction with the maneuver decision criteria section 38 in an operation indicated by the input identify arrow I.D. and the output maneuver option arrow from the section 38. In effect, the section 38 will carry predetermined information about every aircraft in the world that is known to exist at that time with this set of information indicating the maneuvering capabilities of the aircraft, and in preferred order the type of maneuvers most easily executed with least passenger discomfort, with least strain on the equipment, most economical, and safest for the particular aircraft being involved. This, when an aircraft type signal is sent from section 40 to section 38, the loop will close by sending back the preferred maneuver option for that particular aircraft with that option then being introduced into the solution for collision avoidance to see if that option will effect a solution. If the first option will not solve the problem, the second preferred option will then be sent to determine if that will solve the problem. Other potential solutions for the aircraft involved will be established and the optimal solution for each potential conflict between two or more aircraft will be provided.

The section 40 tests all maneuvers before issuing any instructions to determine whether the specific maneuver will avoid conflict with all aircraft in the system. The type of maneuvers presently contemplated involve changes in course, speed, and/or altitude. The objective of the maneuvers is to get all aircraft on safe vectors with respect to all other aircraft and maneuvers will not be indicated as commands until an optimally safety situation is assured by the processor in which no threats of collision are present.

The maneuvering decision information sent from section 40 through the massage format section 36 may be in terms of actual control of the structural components of the aircraft to effect the maneuver in an autopilot type situation or may be visual or sound indications to the pilot as to what is suggested or required to avoid possible conflict. The system is designed to operate to give enough alert time with respect to possible conflict so that perhaps the aircraft pilot can effect maneuvers of his own that will eliminate any necessity for commands to be sent from the section 40. In other words, many times if a pilot is warned about another aircraft in the vicinity, and he can see where the other aircraft is in the vicinity, he can maneuver his plane himself based on his prior experience without relying upon the computer to come up with a new course and/or speed for him to avoid the conflict. In the event that the alert given to the pilot has not resulted in a safe situation, maneuver instructions will be issued to effect a safe situation (pilots can worsen the situation while trying to help — the negative instructions described hereinafter will correct this possibility).

It is contemplated that the section 40 will generate only one maneuvering option, rather than several, with this option being based upon the best possible course to take to avoid conflict. As mentioned above, the maneuvering instruction is sent directly to VFR aircraft, while with respect to IFR aircraft, the signal is sent saying that the computer intends to instruct the pilot to perform this maneuver, and only by utilizing the manual inhibit can the person effecting air control change it.

The invention contemplates that these maneuvering decision signals will be sent to the planes every 0.2 seconds until they are acknowledged by the pilot or in the case of an autopilot operation until the actual control of the aircraft has been effected.

In a situation involving parallel courses, for example, where a turn by either aircraft toward the other might create a potential conflict, negative instructions are sent to each plane indicating it is unsafe to turn one direction or the other as the case might be. There are many other examples besides the parallel course situation where negative instructions will be extremely helpful in collision avoidance.

MONITOR SECTION

Another portion of the associative processor operation which is designed to avoid possible aircraft conflicts involves the monitor section 46. In effect, this section incorporates the filed flight plans for all IFR aircraft in the bulk store 48 for a period of time, such as for example the next 12 hours. The monitor track section 46 then checks all aircraft against their flight plans including flight plan modification inputs 49 as they would normally unfold and determines whether any possible conflicts will occur because of the filed flight plans. The monitor thus by checking all plans previous to their actual operation insures that they will clear without any conflict with filed flight plans and sends the signal to the air control command over the line 49a as necessary to indicate flight plan changes that should be effected. If, for example, a flight plan modification comes in indicating that engine trouble has occurred on the ground and a plane will be leaving 10 minutes behind schedule, that plane could be notified that it should leave 20 minutes behind schedule so as to avoid conflict enroute or at its terminal area, or as a result of overload of the terminal area. This means the plane would stay on the ground 10 minutes longer thereby conserving fuel and equipment making the operation much cheaper and more efficient for everyone involved, plus eliminating potential conflict situations that might occur at the terminal area.

The monitor section 46 also may send signals to the command 49a on the basis of signals received from the tracking section 34 that aircraft are not on their flight plan and that they should effect changes in course and/or speed to get back on their flight plan, or if it is determined that the aircraft cannot get back on their flight plan then to effect a changed flight plan and compare the changed flight plan and all filed plans and other modified plans to determine whether potential conflicts will occur in the future on the basis of this last changed flight plan. It should be understood that the information in the bulk store is updated whenever new flight plans or changes in any flight plan occur and that this data is a function of time in indicating where planes should be at predetermined times in accordance with their filed flight plans.

The great advantage of the associative processor 18 is that it can load information in parallel which is a capability not enjoyed by any other existing processing equipment, and that by loading and processing information in parallel, all computations can be effected simultaneously for all aircraft with respect to conflicts, position determination, maneuvering options, etc., all of which is more fully defined hereinafter with respect to the particular algorithm and conflict detection logic contemplated.

The specific simultaneous data operation of an associative processor is described in more detail in the above-identified co-pending patent application. The operating mode of an associative processor is for parallel read and write capability to effect arithmetic operation simultaneously on all vehicles. The processor utilizes an associative processing memory, such as shown in Pat. No. 3,391,390 and No. 3,548,386 as the basic component. The associative processor can simultaneously perform search, logical, or arithmetic instructions with respect to all words or selected words and/or selected portions of words stored in the memory of associative processor 18. A proper arrangement of the processor to accomplish the desired conflict detection and suggested maneuvering to avoid potential collisions is described hereinafter.

RADAR DATA PROCESSING

GENERAL

Figure 3:
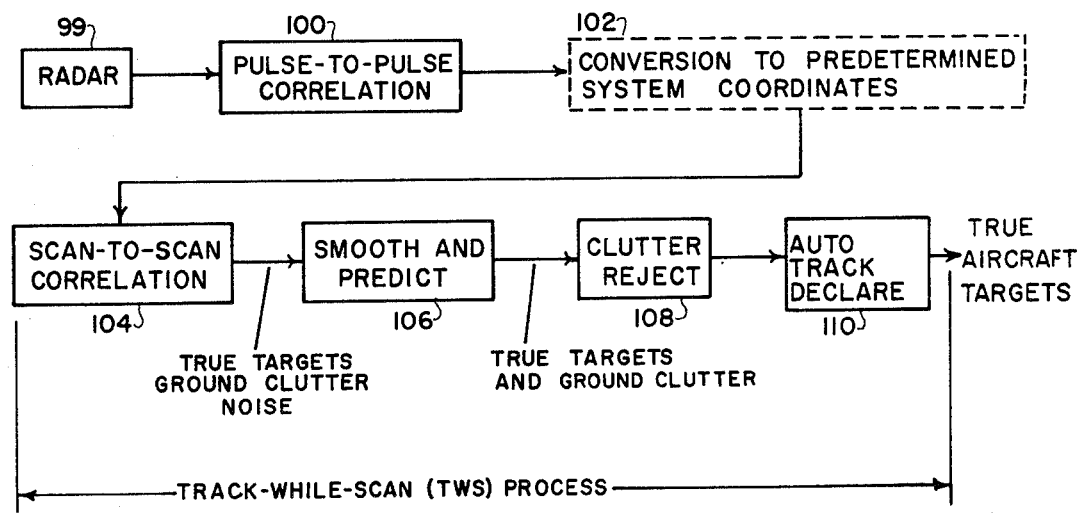
FIG. 3 is a schematic block diagram of a system to process radar data information for utilization in the overall system of FIG. 2.

FIG. 3 shows the basic functions required in radar-data processing. The radar 99 antenna is assumed to rotate at a constant rate. Target reports generated by the search radar are first subjected to a pulse-to-pulse correlation section 100 that filters out most of the noise reports. A section 102 to convert to predetermined coordinates is optional. The reports that are validated in this procedure are next subject to a track-while-scan (TWS) procedure in sections 104, 106, and 108. This procedure automatically starts tracking and identifies the sources of the reports as ground clutter, noise, or true targets. Aircraft within the airspace surrounding the radar are tracked, and track information is presented in real time by section 110 to the display units. The system to achieve position information by trilateration to effect more accurate tracking is better defined in the above-identified patent application.

PULSE-TO-PULSE CORRELATION

The data processing functions included in the pulse-to-pulse correlation section 100 are digital formatting of the radar reports, target correlation and verification, and azimuth beam splitting. The output of radar subsystem 99 is a tentative target declaration when the receiver output exceeds an automatically adjusted signal-to-noise ratio. The declaration includes range and azimuth data. Because of the high noise content anticipated in the output of the radar 99, a multithresholding procedure is proposed. The target reports are subjected successively to thresholding criteria (for example, 2 hits out of 3 transmitted pulses, 3 hits out of 5, 4 hits out of 9, and $n$ hits out of $m$). A tentative target is accepted and reported when $n$ hits are received in less than $m$ transmitted pulses. A true report considered no longer in the radar beam when n misses are recorded after n hits are recorded. These data then are used in a beam-splitting operation to provide a better estimate of azimuth position.

TRACK-WHILE-SCAN PROCESSING

GENERAL

This process consists of five principal activities: (1) scan-to-scan correlation of targets, (2) automatic track initiation, (3) smoothing and prediction of positional data for target tracks, (4) clutter rejection, and (5) automatic track declaration.

SCAN-TO-SCAN CORRELATION SECTION 104

As each radar report is presented to the scan-to-scan correlation section 104, it is compared with previously established tracks. If the position associated with the report agrees, within tolerance, with the predicted position for a given track, the report is said to correlate with the track, and the position of the report is taken to be the current observed position for the track. If the report does not correlate with any track, it is used to automatically initiate a new track. Tracks are terminated if insufficient correlating reports are received from scan-to-scan.

In using reports from the trilateration system 44, the proper tracks are located by the identity of the reporting aircraft, and the tracks are updated. However, because of potential noise in the system each new report is subjected to sufficient tests so that when a report does not exactly coincide with the predicted position the report is validated if it is within certain limits of the predicted position, these limits being set by the error in the position reporting system and errors in track processing. The report is further validated if it is within certain greater limits than those above where these greater limits are set by the acceleration and/or maneuver capabilities of the aircraft. In the event a maneuver or change in acceleration is detected, the track is so marked and the existence of maneuver information is used in conflict prediction. If reports from the trilateration system are not validated, they are discarded and a new report is immediately requested during the next interrogation cycle.

SMOOTHING AND PREDICTING SECTION 106

Smoothing and predicting of positional data are performed by a linear smoothing and predicting section 106. In particular, use is made of the $(\alpha, \beta)$ tracker discussed by Benedict and Bardner in their paper, "Synthesis of an Optimal Set of Radar Track-While-Scan Smoothing Equations", IRE Transactions on Automatic Control, July 1962. In addition, we have found that proper choice of smoothing and prediction weighting parameters results in an optimal linear tracker in the sense of noise reduction and maneuver following capability. Such choice is based on the quality of the particular track and the maneuvers being executed. An acceleration parameter $(\gamma)$ is added when required to effect smooth performance of the tracker.

It will be evident to those skilled in the art that the weighting parameters $(\gamma; \beta, \gamma)$ will be different for radar track and trilateration tracks because of the differences in accuracy of reported position of the two systems. The trilateration reports are substantially more accurate and are available more frequently.

CLUTTER REJECT SECTION 108

The proposed track-while-scan correlation procedure includes provision for rejecting tracks due to ground clutter. Tracks are identified as due to ground clutter on the basis of their associated velocity term. The tracker associates with each track a velocity component in each of the reference coordinates. Tracks due to ground clutter have apparent velocity components of low or zero magnitude. Accordingly, the track-while-scan correlation procedure specifies a periodic examination of all tracks and the rejection of those whose maximum velocity component is less in magnitude than an established tolerance, and this is accomplished by section 108.

AUTOMATIC TRACK INITIATE SECTION 110

In general, track-while-scan surveillance systems cannot perform automatic track initiation. The track initiate function is usually manual operation in which an operator indicates a specific radar target to the data processor for tracking. The reason that automatic initiation has not been achieved lies in the limitations of conventional data processors. The associative processor 18 overcomes these limitations and establishes a track for each sensor report.

An outstanding feature of the track-while-scan correlation procedure lies in a provision for automatic track declaration and for rejection of tracks due to noise. Automatic track declaration and validation are effected by associating with each track a quality tag that increases up to some terminal value with successive correlations. Tracks whose quality tag exceeds a fixed level are considered to be valid. Valid tracks are assumed to represent aircraft and are automatically displayed.

Detecting tracks due to noise presents a formidable problem but fortunately one that need not be solved explicitly. In fact, the automatic track declaration and validation procedure obviates the problem. There is a vanishingly small probability that a track due to noise will achieve a quality tag level associated with a validated target. Hence, by displaying only those tracks whose quality tag exceeds a fixed level, tracks due to noise are automatically rejected.

CORRELATION WITH OTHER SENSORS

As proposed, correlation with other sensors is carried out directly in the associative processor 18. For beacon inputs, correlation is performed in succession on range, identity, and altitude. A beacon target report is given priority over a radar report; that is, a beacon report rather than a radar report is processed in the track-while-scan mode. The beacon in this case may be considered to be a scanning system similar to radar, or a trilateration system as defined in the above-identified application that provides nearer to continuous tracking by rapid successive sampling.

SITUATION DISPLAY PROCESSING

Automated information display techniques for the CRT display 22 should provide the display operators 24 with a means of requesting complex searches on a large track file such as the bulk store 48 or the tracking section 34. The associative processor performs the complex search operation with an execution time that is independent of the number of aircraft in the track file. The associative processor stores new data, updates old information, rapidly searches the track file, and distributes the requested data to the proper consoles. It can refresh the display screen at a rate that minimizes operator fatigue.

INFORMATION RETRIEVAL

The associative processor-based information retrieval system which I propose is capable of interrogating a bulk store 48 in excess of 25 million bits in less than 0.1 seconds. Each interrogation may include a complex pattern of operations. The items responding to the search may also be updated or deleted, if requested.

The associative processor 18 for the information retrieval system contains any number of words desired. A bulk storage system is used for the data base. Parallel readin of data to all words in the associative processor memory is provided through the response store, thus overcoming input/output constraints. These inputs then are processed using the simultaneous search capability of the associative processor. The associative processor, in turn, communicates with the several query stations via a bussing system. These structural features are more fully defined in application Ser. No. 1,495 filed Dec. 29, 1969, for which I am a co-inventor.

PULSE-TO-PULSE CORRELATION ALGORITHMS

GENERAL

Figure 4:
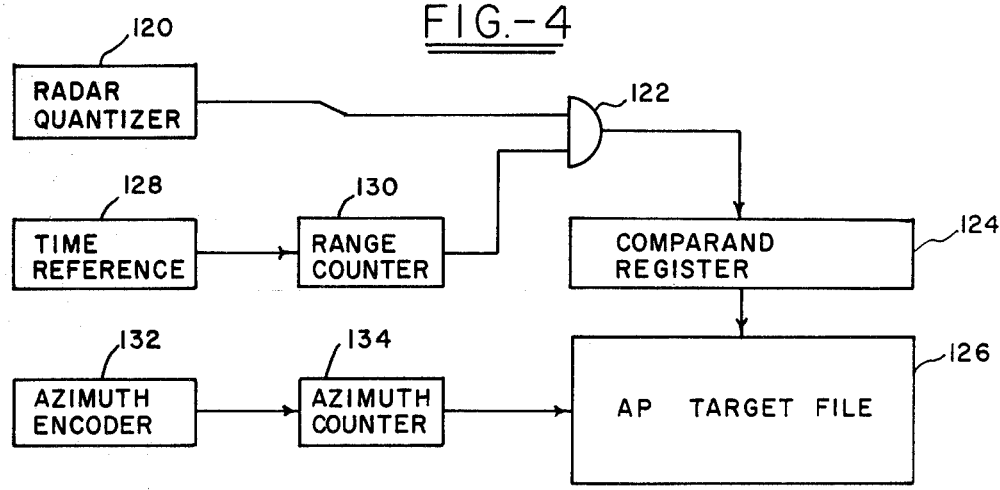
FIG. 4 is a schematic block diagram of a system for pulse-to-pulse correlation.
Figure 5:
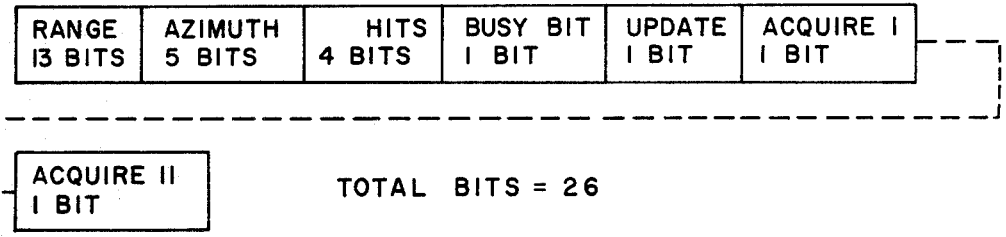
FIG. 5 is a word format for pulse-to-pulse correlation.

Since pulse-to-pulse correlation is a significant part of radar-data processing, algorithms for performing this operation will now be described. FIG. 4 shows a simplified block diagram of a system configuration for pulse-to-pulse correlation. FIG. 5 shows the associative processor word format.

CORRELATION ALGORITHM

A target declaration from a radar quantizer 120 causes range data to be gated through gate 122 into the comparand register 124 of the associative processor and starts the correlation process, see FIG. 4. A between-limits search on range is made. If no match is found, the target declaration is accepted as a tentative new target. A search then is made on the bit column of the associative processor target file 126 to locate an empty word and the new target is written into the target file at the empty word. The range of target and the azimuth position are inserted. A one is inserted into the update, acquire-I, and busy-bit columns for the word, as seen in FIG. 5.

Figure 6:
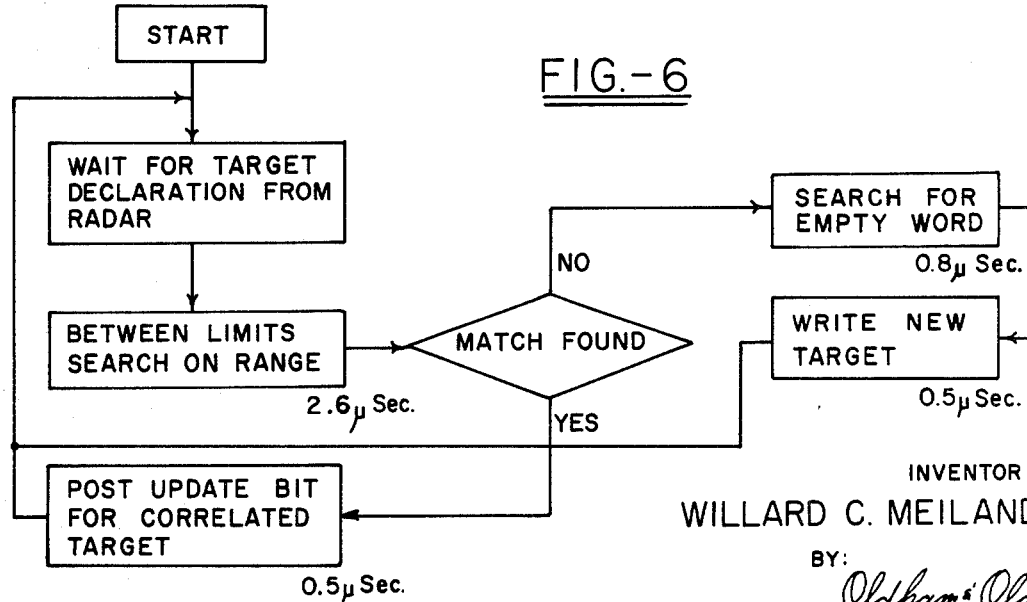
FIG. 6 is an information flow chart for pulse-to-pulse correlation.

If a match is found, a one is merely inserted in the update column for the word. The operating time required for the execution of each operation is indicated outside the lower right-hand corner of each operation box in FIG. 6. A total of 3.9 $\mu$ seconds is required for the correlation of a new target and 3.1 $\mu$ seconds for a previously reported target. These correlations are the only pulse-to-pulse operations performed in real time, and are typical times based on the state of the art in the presently known equipment.

TARGET VERIFICATION

Figure 7:
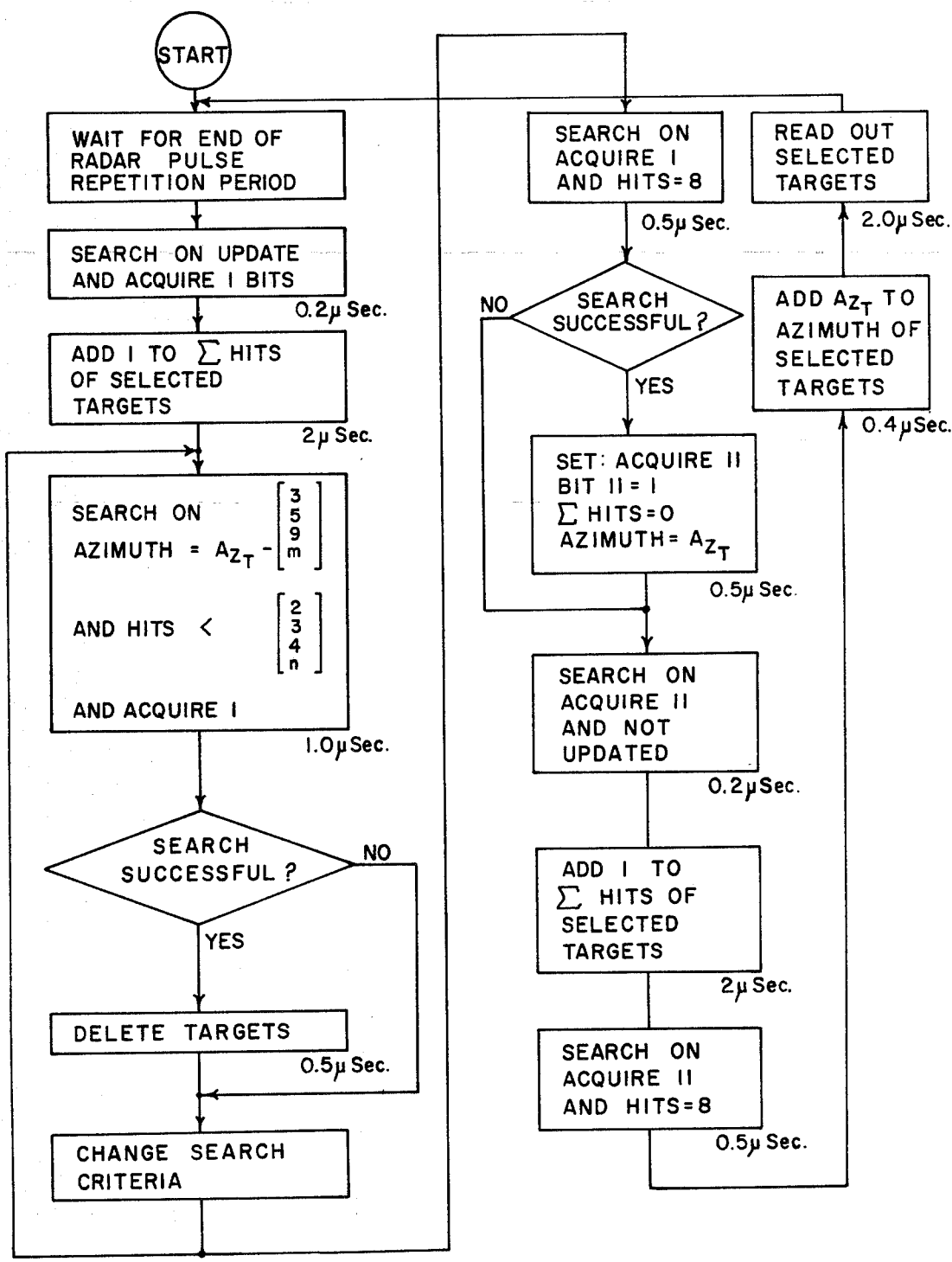
FIG. 7 is an information flow chart for pulse-to-target verification and beam splitting.

The target verification and beam-splitting operations are performed in the dead-time at the end of the radar pulse repetition period and require 18 $\mu$ seconds for all the targets (see FIG. 7).

A search is made on the update and acquire-I bits. This search locates all tentative targets that have received a hit during the radar pulse repetition period immediately prior to the search. A one is added to the summation of hits field for all of such words. This operation takes place simultaneously in parallel for all words.

Next, a search is made on the azimuth field to locate those targets for which the stored target azimuth is equal to the current azimuth in the azimuth counter, less 3. This search will locate all targets that were first reported 3 pulses before the current transmitted pulse. A search for a number less than two then is made on the summation of hits in range field and this search is logically anded with the previous search. The result is to locate all targets that fail a 2 hits out of 3 transmitted pulses acceptance threshold. These targets then are regarded as false targets and deleted from the associative processor target file 126. This procedure is repeated to implement thresholds of 3 hits out of 5, 4 out of 9, and $n$ out of $m$. The multiple threshold filtering is proposed because of the high noise level anticipated from the radar.

The next operations locate targets for which n hits have been received in less than m transmitted pulses. Such targets are considered true targets. The acquire–II bit is set to one to indicate this fact. If target reports are not received (misses), they are now counted for these targets. This procedure is carried out by searching for targets that have the acquire–II set, but not the update bit set.

When n misses are received, the target is considered to no longer exist in the antenna beam. Adding the increment of current azimuth to the stored increment of acquire azimuth, dividing by two, and subtracting this from current azimuth provides the best estimate of the true azimuth position in the azimuth field (beam-splitting operation). The target word now can be read out for subsequent coordinate transformation and scan-to-scan operations.

The remaining components of the system of FIG. 4 are a time reference 128, a range counter 130, an azimuth encoder 132, and an azimuth counter 134. The associative processor file 126 can be a component of the radar correlation function 30, or a separate associative processor at radar site 42.

TRACK-WHILE-SCAN ALGORITHMS

GENERAL

This section describes the track-while-scan (TWS) algorithms. The discussion covers methods of target acquisition and correlation; smoothing and predicting target positional data; and implementation of the TWS procedure on the associative processor. The following applies to radar reports. Systems such as the trilateration approach defined in my above-identified application are treated later.

ACQUISITION AND CORRELATION

As each radar report is presented to the data processing system, it is compared with previously established tracks. Each track is kept in an associative word, which in part has the following form:

| Field | 9 | 8 | 7 | 6 | 5 | 4 | 3 | 2 | 1 |
|---|---|---|---|---|---|---|---|---|---|
| Contents | $\dot{x}$ | $\dot{y}$ | $\dot{h}$ | $x_p$ | $y_p$ | $h_p$ | $x$ | $y$ | $h$ |

Fields 3, 2 and 1 contain $x$, $y$ and $h$, respectively, the current observed coordinates for the track (that is, the observed coordinates of the target associated with the track). Fields 6, 5, and 4, contain $x_p$, $y_p$, and $h_p$, respectively, the current predicted coordinates for the track (that is, the coordinates at which the track target is expected next to be seen). Fields 9, 8, and 7 contain $x$, $y$, and $h$, respectively, the current directional velocities for the track. Smoothing of observed positional data, and computation of predicted positions and velocities are accomplished by means of the $(\alpha, \beta)$ tracking equations discussed below.

If the position associated with the report agrees, within tolerance, with the predicted position for a given track, the report is said to correlate with the track, and the position of the report is taken to be the current observed position for the track. If the report does not correlate with a track, it is used to automatically initiate a new track. Tracks are terminated if insufficient correlating reports are found from scan to scan.

The method of initiating and maintaining a track is as follows: when a radar report is received that correlates with no established track, it is used to initiate a new track, and the new track is said to be in State 1. A large square box of V miles (see FIG. 8) is centered about the position of the report, and subsequent to the next sweep of the radar, a check is made to see if any new report lies in the box. If so, the new report is said to correlate with the newly established track. Smoothed position and velocity values are calculated to update the track, and the track is advanced to State 2. A smaller square box of W miles is then centered about the predicted position for the next report for the track. Subsequent to the next sweep of the radar, a check is made to see if any new report lies in the box. If so, the new report is said to correlate with the track. New smoothed position and velocity values are calculated to update the track, and the track is advanced to State 3. The process continues in the same fashion, with smaller boxes being used as track quality increases. State values for a track increase with each successive correlation up to terminal state.

Figure 8:
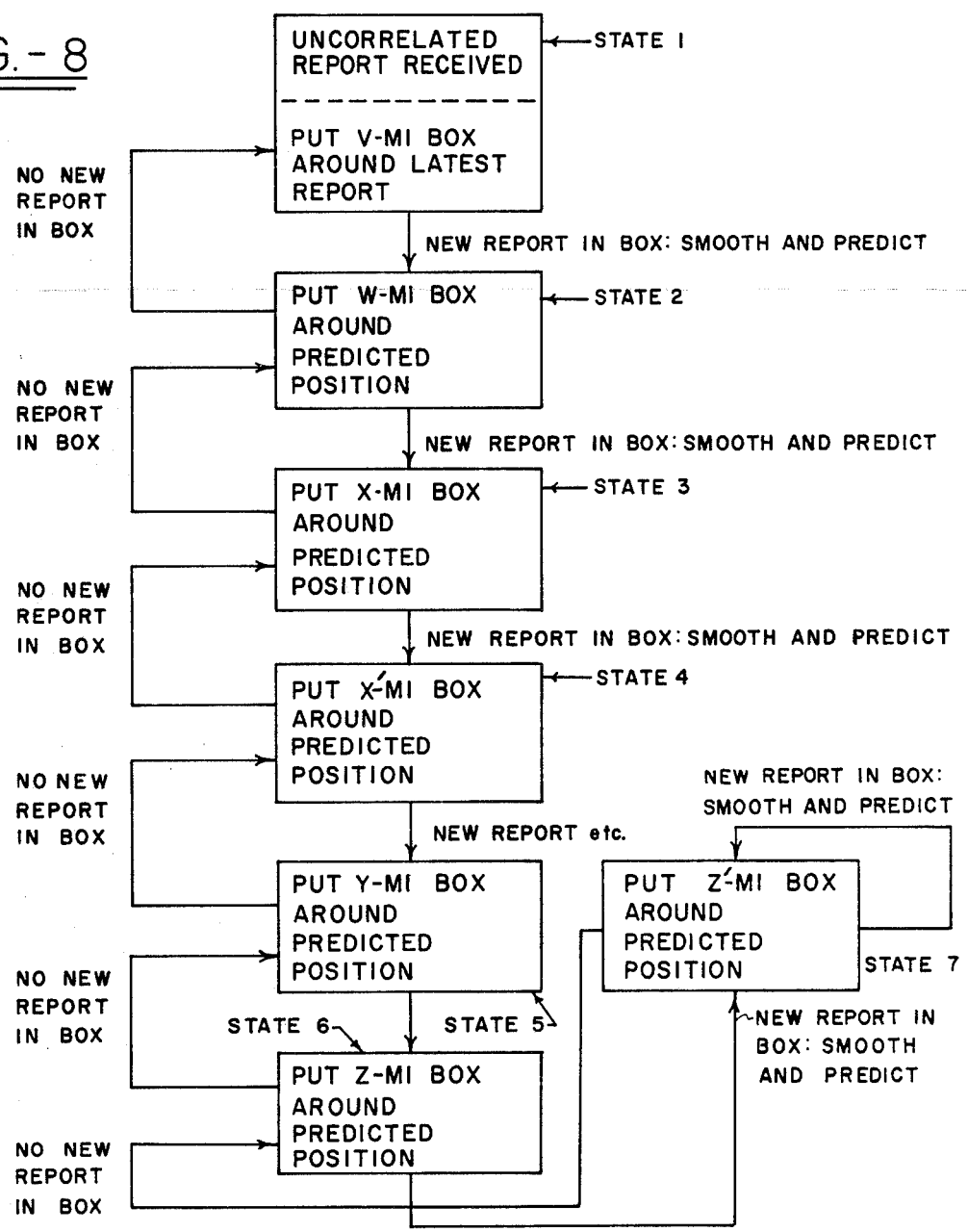
FIG. 8 is a block diagram indication of the state progression for target track to show how target smoothing and predicting is effected.

FIG. 8 presents a flow chart for a seven-state tracking procedure, showing how a target track would progress from state to state. In the associative processor implementation of the acquisition and correlation procedure, state values are accounted for by associating with each track a quality tag that reflects the current track state. Tracks whose quality tag indicated progression beyond a certain state, in particular State 5 of FIG. 8, would be considered valid and in fact to represent aircraft. Such tracks would automatically be accepted and displayed. The choice of box size used in the correlation search depends on track quality, accuracy of reported target position, and maneuvering capabilities of the target.

The flow chart in FIG. 8 indicates how a track passes from state to state as successive correlations with reported targets are made. The size of the search boxes used in the correlation process decreases as track quality increases with successive correlations. Provision can be made for increasing the size of the search boxes if, due to maneuvering, the target associated with a track cannot be found in the search box associated with the present track state. The provision for increasing box size for a track when no correlating return is found is not meant to account for the case where a target is missed by the radar acquisition system rather than by the failure of the correlation algorithm.

Where a correlation fails to occur because a target is missed by the radar acquisition system, it is not desirable to increase the search box size. This might produce an apparently correlating report, which would be due to noise or the target for a different track. A possible procedure in the case of a missed radar report would be to assume that the plane's position is at the latest predicted position and to continue the smoothing and prediction scheme on that basis, with a modification made in the measure of the track quality.

However, the implementation of such a procedure presents obvious difficulties. When a correlation fails to occur, it is not known whether the failure is due to the target's maneuvering, failure of the radar acquisition process, or other causes. Hence, a decision-making process must be evolved for selecting the policy to be used in the correlation process when a track cannot be correlated with a radar report during one sweep of the radar.

A possible policy is as follows: first, limit the increase in box size allowed in the attempt to achieve correlation. For example, if a State 7 track fails to correlate using a z-size, allow the box size to increase only up to a x-size box. Second, for each target track in State 3 or beyond, assume the correlation failure to be due to radar fault, reduce the track state by one, set the present position of the target to be the predicted position, and compute a new predicted position. Third, delete the target tracks in State 1 that failed to achieve correlation.

If correlation fails with a box corresponding to the current track state, but correlates with a lower track state, assume the radar report was missing for the current track, and continue to predict on past information while reducing state or track quality. Further assume as well that the aircraft was turning and establish a second track starting from the correlated predicted position. The decision to start a second track will be dependent on the track quality state of the near track such that tracks of low quality will not initiate new tracks but high quality tracks will. In this manner, turning tracks will be retained, and the maneuver detected. This bifurcated tracking process will retain maneuvering targets in an optimal fashion.

SMOOTHING AND PREDICTING

Smoothing and predicting of positional data will be performed by a linear smoothing and predicting scheme. In particular, the tracker assumed is the $(\alpha,\beta)$ tracker discussed by Benedict and Bardner in their paper "Synthesis of an Optimal Set of Radar Track-While-Scan Smoothing Equations," IRE Transactions on Automatic Control, July, 1962. The $(\alpha,\beta)$ tracker consists of the following set of equations:

$$\bar{x}_n = x_{p-1} + d(x_n - x_{p-1})$$

$$\bar{\dot{x}}_n = \bar{\dot{x}}_{n-1} + \beta/T(x_n - x_{p-1})$$

$$x_p = \bar{x}_n + T\bar{\dot{x}}_n$$

where
$\dot{x}$ = time derivative
$x_n = n^{th}$ observed position
$\bar{x}_n = n^{th}$ smoothed position
$x_{pn} = n^{th}$ predicted position, and
$\beta$ = weighting factors $T$ = time interval between observations Benedict and Bardner showed that choosing $\beta = \alpha/2$ — results in an optional linear tracker in the sense of noise reduction and maneuver following capability.

It is assumed that, in the TWS system, the time interval T of the equation above is constant. The assumption of a constant T tends to introduce a discrepancy between predicted and observed position of a plane being tracked, since only rarely will the time be constant between observations of the plane by the radar. My estimate of the maximum discrepancies indicates they are not significant in TWS, when an update rate of 0.2 seconds is used.

Improvements in the tracking algorithm are developed by adding an expression for acceleration when it is determined that acceleration exists. The acceleration term is of the form:

$$\bar{\ddot{x}}_n = \bar{\ddot{x}}_{n-1} + \gamma/T^2 (x_n - x_{p-1})$$

and then the expression for the predicted position becomes:

$$x_{pn+1} = x_n + T\bar{\dot{x}}_n + T^2\bar{\ddot{x}}_n$$

Acceleration criteria and values of $\gamma$ exist when a turn is detected and the acceleration terms are 0 when a turn does not exist or at its conclusion, as based on repeated evaluation of velicity. Further, the values of $\alpha, \beta$ and $\gamma$ are chosen so that the filter is adaptively optimized for maximum stability in velocity by examination of the error in predicted position, and predicted speed, and the track quality. I have found that the values of $\alpha, \beta$ and $\gamma$ are best determined experimentally, and this is well within the ability of one skilled in the art.

It will be apparent to one skilled in the art that the values of weighting function $\alpha, \beta$ and $\gamma$ will be different for radar tracks and for trilateration tracks because of the differing precision of the two sensors and because of the differing sampling times.

While these many tests to establish the proper weighting functions are difficult in conventional processors, they are easily accomplished in an associative processor. In the implementation following, while the acceleration terms are not shown nor are the decision criteria for $\alpha, \beta$, and $\gamma$ shown, it will be obvious to one skilled in the application of an associative processor that these steps are easily implemented.

It should be remembered that while only one coordinate is considered above the other coordinates with possible cross coupling terms must be treated to establish the best possible velocity vector and thus the best prediction of future position.

IMPLEMENTATION ON ASSOCIATIVE PROCESSOR (AP)

Figure 9:
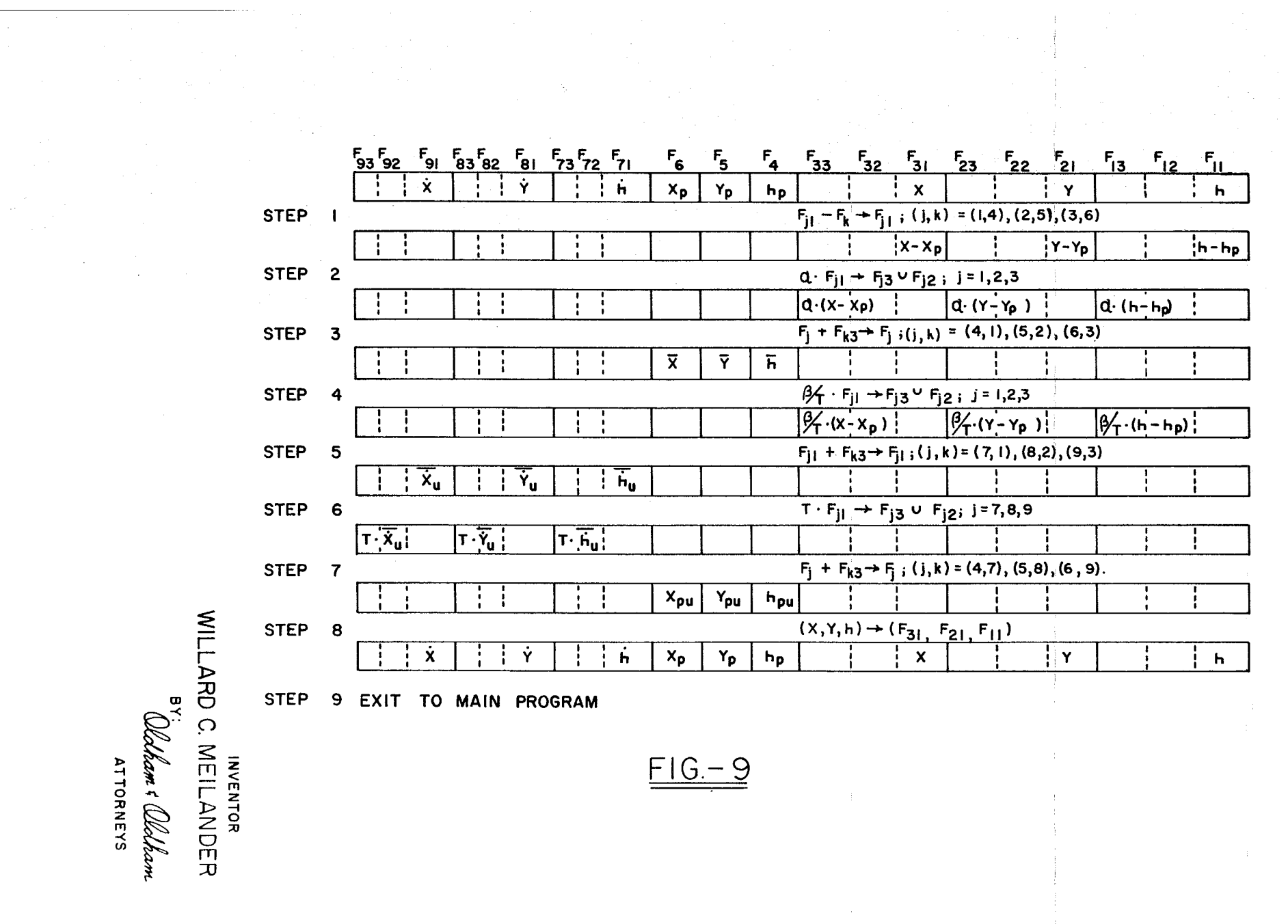

The $(\alpha,\beta)$ tracker is to be implemented on the AP. A program has been written to effect this implementation. A listing of the program is given in FIG. 9. A step-by-step commentary on the program follows:

Each target track is kept in an AP word, which in part has the following form:

| Field | 9 | 8 | 7 | 6 | 5 | 3 | 3 | 2 | 1 |
|---|---|---|---|---|---|---|---|---|---|
| Contents | $\dot{x}$ | $\dot{y}$ | $\dot{h}$ | $x_p$ | $y_p$ | $h_p$ | $x$ | $y$ | $h$ |

Fields 3, 2 and 1 contain $x$, $y$ and $h$, respectively, the current observed coordinates for the track (that is, the observed coordinates of the target associated with the track). Fields 6, 5 and 4 contain $x_p$, $y_p$ and $h_p$, respectively, the current predicted coordinates for the track (that is, the coordinates at which the track target is expected next to be seen). Fields 9, 8 and 7 contain $\dot{x}$, $\dot{y}$ and $\dot{h}$, respectively, the current directional velocities for the track. Smoothing of observed positional data and computation of predicted positions and velocities are accomplished by means of the $(\alpha,\beta)$ tracking equations discussed above and the AP program listed in FIG. 9. Each step of the AP program is to be executed concurrently for all tracks ready for positional updating at the time of program execution.

Step 1 is started at an appropriate time and specifies for all tracks the operation:

$$F_{J1} - F_k \rightarrow F_{J1}; (j,k) = (1,4), (2,5), (3,6) \quad (1)$$

That is, Field $F_k$ is subtracted from Field $F_{J1}$, and the result is placed in Field $F_{J1}$, giving in Fields $F_{31}$, $F_{21}$, and $F_{11}$ the quantities $x-x_p$, $y-y_p$, and $h-h_p$, respectively. Fields not specified in Equation (1) are not affected. In the step-by-step listing of FIG. 9, only the fields whose contents results from the present operation (step) are displayed at each step.

Step 2 specifies for all tracks the operation:

$$\alpha \cdot F_{j1} \rightarrow F_{j3} \cup F_{j2} ; j = 1, 2, 3 \qquad (2)$$

That is, Field $F_{j1}$ is multiplied by the determined values of $\alpha$, and the result is placed in the union of Fields $F_{j3}$ and $F_{j2}$. Field $F_{j2}$ is provided to account for scaling in the product $\alpha \cdot F_{j1}$. Hence, Step 2 results in Fields $F_{33}$, $F_{23}$ and $F_{13}$, containing the scaled products $\alpha(x_n - x_{p-1})$, $\alpha(y_n - y_{p-1})$, and $\alpha(h_n - h_{p-1})$, respectively. Fields not specified in Equation (2) are not affected.

Step 3 specifies for all tracks the operation:

$$F_j + F_{k3} \rightarrow F_j ; (j, k) = (4, 1), (5,2), (6,3) \qquad (3)$$

That is, Field $F_j$ is added to Field $F_{k3}$, and the result is placed in Field $F_j$, giving in Fields $F_6$, $F_5$ and $F_4$ the smoothed positions $\bar{x}_n = x_{p-1} + \alpha(x_n - x_{p-1})$, $\bar{y}_n = y_{p-1} + \alpha(y_n - y_{p-1})$ and $\bar{h}_n = h_{p-1} + \alpha(h_n - h_{p-1})$, respectively. Fields not specified in Equation (3) are not affected.

Step 4 specifies for all tracks the operation:

$$\beta/T \cdot F_{j1} \rightarrow F_{j3} \cup F_{j2}; j = 1, 2, 3 \qquad (4)$$

That is, Field $F_{j1}$ is multiplied by the determined values of $\beta/T$, and the result is placed in the union of Fields $F_{j3}$ and $F_{j2}$. Field $F_{j2}$ is provided to account for scaling in the product $\beta/T \cdot F_{j1}$. Hence, Step 4 results in Fields $F_{33}$, $F_{23}$ and $F_{13}$ containing the scaled products $\beta/T(x_n - x_{p-1})$, $\beta/T(y_n - y_{p-1})$ and $\beta/T(h_n - h_{p-1})$, respectively. Fields not specified by Equation (4) are not affected.

Step 5 specifies for all tracks the operation:

$$F_{j1} + F_{k3} \rightarrow F_{j1}; (j,k) = (7,1), (8,2), (9,3) \qquad (5)$$

This is, Field $F_{j1}$ is added to Field $F_{k3}$, and the result is placed in Field $F_{j1}$, giving in Fields $F_{91}$, $F_{81}$ and $F_{71}$ the updated smoothed velocities $\bar{x}_u = \dot{x} + \beta/T(x_n - x_{p-1})$, $\bar{y}_u = \dot{y} + \beta/T(y_n - y_{p-1})$, and $\bar{h}_u = \dot{h} + \beta/T(h_n - h_{p-1})$, respectively.

The subscript $u$ is used to indicate that the values have been updated during the present execution cycle of the program. Fields not specified in Equation (5) are not affected.

Step 6 specifies for all tracks the operation:

$$T \cdot F_{j1} \rightarrow F_{j3} \cup F_{j2}; j = 7, 8, 9 \qquad (6)$$

That is, Field $F_{j1}$ is multiplied by the constant (comparand) $T$, and the result is placed in the union of Fields $F_{j3}$ and $F_{j2}$. Field $F_{j2}$ is provided to account for scaling in the product $T \cdot F_{j1}$. Hence, Step 6 results in Fields $F_{83}$, $F_{83}$, and $F_{73}$ containing the scaled products $T\bar{x}_u$, $T\bar{y}_u$, and $T\bar{h}_u$, respectively. Fields not specified by Equation (6) are not affected.

Step 7 specifies for all tracks the operation:

$$F_j + F_{k3} \rightarrow F_j; (j,k) = (4,7), (5,8), (6,9) \qquad (7)$$

That is, Field $F_j$ is added to Field $F_{k3}$, and the result is placed in Field $F_j$, giving in Fields $F_6$, $F_5$ and $F_4$ the updated predicted positions $x_{pu} = \bar{x} + T\bar{x}_u$, $y_{pu} = \bar{y} + T\bar{y}_u$, and $h_{pu} = \bar{h} + T\bar{h}_u$, respectively. The subscript $u$ is used to indicate that the values have been updated during the present execution cycle of the program. Fields not specified by Equation (7) are not affected.

Step 8 specifies the operation:

$$(x, y, h) \rightarrow (F_{31}, F_{21}, F_{11}) \qquad (8)$$

That is, new observed values of Track Coordinates $x$, $y$, and $h$ are inserted into Fields $F_{31}$, $F_{21}$, and $F_{11}$, respectively. This occurs subsequent to track correlation and at any time prior to the simultaneous updating of all tracks.

Step 9 specifies transfer of control to the main program.

It should be remembered that the above steps are carried out simultaneously for all the tracks in the system.

COLLISION AVOIDANCE ALGORITHMS

INTRODUCTION

This section describes two methods for handling collision avoidance in the Associative Processor (AP). Method 1 involves a two or three dimensional equation of the point/slope form that describes the flight path for each target. Method 2 is a more sophisticated three dimensional approach that considers the controlled air space around each aircraft and expands this air space for future predictions to take care of the expanding uncertainty in aircraft positions.

METHOD I

Figure 10:
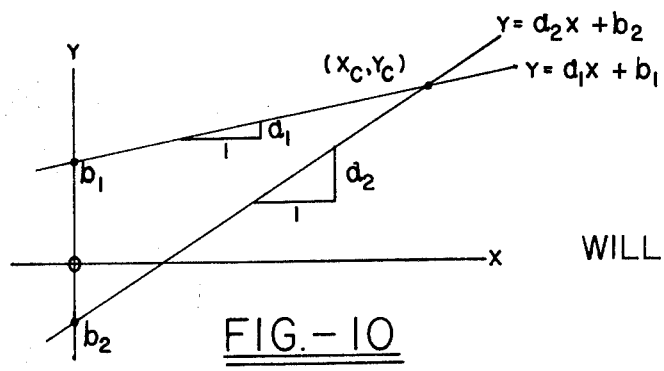
FIG. 10 illustrates one approach which might be utilized to determine the threat of vehicle collision, which is the evaluation of flight path vector intersection.

Assume that the flight paths of two aircraft 1 and 2 are described by the slopes and equations of FIG. 10. In FIG. 10, the equations are of the point/slope form where the slope $a = \Delta y/\Delta x$, but $\Delta x = \dot{x}t$ and $\Delta y = \dot{y}t$. Hence, for the same time interval, $a = \dot{y}/\dot{x}$.

If $x_n$ and $y_n$ are the coordinates of a target at any given time, $a$ can be found as above and $b$ can be found by $b = y_n - ax_n$.

The potential point of collision $(x_c, y_c)$ can be found by solving this set of equations:

$$y - a_1 x = b_1 \qquad \text{1-1}$$
$$y - a_2 x = b_2$$

$$x_c = \begin{vmatrix} 1 & b_1 \\ 1 & b_2 \\ 1 - a_1 \\ 1 - a_2 \end{vmatrix} = \frac{b_2 - b_1}{a_1 - a_2} \qquad \text{1-2}$$

Only the solution for $x_c$ is needed since only one of the two coordinates is used in the calculation of time for each target to intersect the paths of each of the other targets.

With the above background, consider FIG. 11, the collision avoidance algorithm flow chart for Method I, which has the following steps:

1. Periodically extract a track $T$ from the track file and calculate its slope $a_T$ and $y$ intercept $b_T$.

2. Examine "$a_T$"; if it is less than 1, proceed to Step 3; if it is not, then go to Step 4; keeping "$a_T$" less than 1 avoids the case where "$a_T$" approaches infinity.

3. Calculate slope "$a_i$" and $y$-intercept "$b_i$" for all targets, and go to Step 5.

4. If "$a_T$" is not less than 1, switch $T$ and all other tracks to equations having the form $x = ay + b$ and solve for $a$ and $b$.

5. Determine if $|a_i - a_T| < K$, where $a_i$ is the slope for each of the other targets, $a_T$ is the slope for $T$, and $K$ is some predetermined constant; this is done to determine if target $i$ is flying a path that is parallel to that of $T$. If parallel, i.e., $|a_i - a_T| < K$, then proceed to Step 16; if not, proceed to Step 6.

6. Calculate $x_c$, a potential coordinate of collision, for each of the other paths with the path of T:

$$x_{c_i} = \frac{b_T - b_i}{a_i - a_T} \qquad \text{1-3}$$

If $x_i$ in Step 3 or $y_i$ in step 4 are zero, the value $x_c$ will be $x_i$. This is the case where an intercept does not exist and the intercept $x_c = x_i$.

7. Calculate the time for track $T$ to collide with all other tracks:

$$t_{T_i} = \left| \frac{x_{ci} - x_T}{\dot{x}_T} \right|. \qquad \text{1-4}$$

8. Determine if $t_{T_i} < 2$ minutes in all tracks; if yes, set flag bit $q$ for each response.

9. Determine if a new $t_i$ has been calculated. If Step 9 rather than Step 13 is being performed, it has not been; if no, proceed to Step 10; if yes, proceed to Step 14.

10. Proceed to Step 11 only for those targets having flag bit $q$ set; if $q$ is not set for any target, exit.

11. If $q_i$ is set, calculate the time for all other tracks to collide with track T:

$$t_i = \left| \frac{x_{c_i} - x_i}{\dot{x}_i} \right|. \qquad \text{1-5}$$

12. Determine if $t_i < 2$ minutes in those tracks that remain; if yes, set flag bit $r$ for each response.

13. Determine if a new $t_i$ has been calculated. If Step 13 rather than Step 9 is being performed, it has been; if yes proceed to Step 14; if no, proceed to Step 10.

14. Proceed to Step 15 only for those targets having flag bit $r$ set; if $r$ is not set for any target, exit.

15. If $r_i$ is set, determine if $| t_{T_i} - t_i | < 1$ minute; if yes, a maneuver decision is determined as indicated by block 40 of FIG. 2.

The first preferred maneuver is applied to one of the aircraft in conflict and the aircrafts future position and velocity vector is calculated for a time of 1 minute. This position is then inserted as in Step 1 above and all aircraft are updated for one minute at their present velocities. The tests are performed to establish a conflict free situation. If this situation exists the maneuver decision is transmitted to the aircraft or to the controller as mentioned above.

If the situation is not conflict free, different maneuvers are tested and applied to both aircraft until an optimal set of maneuvers provides a conflict free situation.

16. If flight paths are essentially parallel, determine if $y$-intercepts are less than 3 miles apart; if no, conflict is not imminent.

17. If less than 3 miles, determine if the time for the aircraft to meet is less than 1 minute; if yes, proceed as in Step 15 above.

In the above explanation, the following should be noted:

1. The values of the constants are merely best-guess at this time and can easily be changed.

2. Sign bits of velocity vectors can be accounted for, but for ease in understanding the method rather than minute details, they have not been considered in the explanation.

3. Altitude has not been included, but where this parameter is available, the following calculation can be made for each target if a collision is imminent in $x$ and $y$:

$$h_{c_i} = h_{n_i} \pm \dot{h}_i t_c, \quad \text{1–6 where}$$

$h_{c_i}$ = altitude at potential point of collision for target $i$,
$h_{n_i}$ = present value of altitude for target $i$,
$\dot{h}_i$ = rate of altitude change of target $i$, and
$t_{c_i}$ = time to reach potential point of collision for target $i$.

If $| h_{c_i} - h_{c_T} | < k$, where $h_{c_T}$ = altitude at potential point of collision for target T, and $k$ is a predetermined threshold, then a collision is imminent.

FIG. 12 shows the buildup of the associative processor word structure for a given target necessary to implement the collision avoidance algorithm. The step numbers and resulting word correspond to the steps as numbered on the flow chart. Since position coordinates and velocity information is already in the associative processor word for other functions, they are not shown here.

METHOD 2.

Another method places a box of safe air space centered about each aircraft. The sides of the box extend the minimum safe separation distances in three dimensions from each aircraft. The size of the box expands in three dimensions with time to take care of the expanding positioned uncertaintly as aircraft positions are predicted farther into the future. The aircraft positions are then predicted into the future and the possibility of collision exists if any one aircraft will violate the safe air space box of another aircraft within some safe warning time.

Let one aircraft be at $x_o, y_o, h_o$ flying at velocities $\dot{x}_o, \dot{y}_o, \dot{h}_o$, and another aircraft be at $x_i, y_i, h_i$ flying at velocities $\dot{x}_i, \dot{y}_i, \dot{h}_i$. It is desired to determine if one aircraft will violate the air space of the other within some time interval $(O,T)$. The controlled airspace around one aircraft is $\pm\Delta_x, \pm\Delta_y, \pm\Delta_h$ at current time and expands with velocities $\dot{\Delta}_x, \dot{\Delta}_y, \dot{\Delta}_h$, to take care of the expanding uncertainty as aircraft positions are predicted farther into the future.

There will be conflict if and only if the following three inequalities are simultaneously satisfied for some time $t \geq 0$:

$$| x_i + \dot{x}_i t - x_o - \dot{x}_o t | \leq \Delta_x + \dot{\Delta}_x t, \quad 2\text{-}1$$
$$| y_i + \dot{y}_i t - y_o - \dot{y}_o t | \leq \Delta_y + \dot{\Delta}_y t, \quad 2\text{-}2$$
$$| h_i + \dot{h}_i t - h_o - \dot{h}_o t | \leq \Delta_h + \dot{\Delta}_h t, \quad 2\text{-}3$$

The easiest way to find whether such a $t$ exists is to compute a minimum and maximum $t$ for each inequality and compare. Thus, if

| | |
|---|---|
| $t_{min\,1}$ = minimum time satisfying | 2-1 |
| $t_{max\,1}$ = maximum time satisfying | 2-1 |
| $t_{min\,2}$ = minimum time satisfying | 2-2 |
| $t_{max\,2}$ = maximum time satisfying | 2-2 |
| $t_{min\,3}$ = minimum time satisfying | 2-3, |
| $t_{max\,3}$ = maximum time satisfying | 2-3 | then there is a conflict within the time interval $O$ to $T$ if and only if Maximum $(0, t_{min\,1}, t_{min\,2}, t_{min\,3}) \leq$ Min $(t_{max\,1}, t_{max\,2}, t_{max\,3}, T)$. 2-3a Inequality 2-1 is equivalent to the following pair of inequalities:

$$-\Delta_x - \dot{\Delta}_x t \leq x_i + \dot{x}_i t - x_o - \dot{x}_o t, \quad 2\text{-}4$$

$$x_i + \dot{x}_i t - x_o - \dot{x}_o t \leq \Delta_x + \dot{\Delta}_x t, \quad 2\text{-}5$$

which can be modified to produce $$x_o - x_i - \Delta_x \leq (\dot{x}_i - \dot{x}_o + \dot{\Delta}_x) t, \quad 2\text{-}6$$

$$x_o - x_i + \Delta_x \geq (\dot{x}_i - \dot{x}_o - \dot{\Delta}_x) t. \quad 2\text{-}6a$$

Let $$A = \frac{x_o - x_i + \Delta_x}{\dot{x}_i - \dot{x}_o - \dot{\Delta}_x} \quad 2\text{-}7$$

and $$B = \frac{x_o - x_i - \Delta_x}{\dot{x}_i - \dot{x}_o - \dot{\Delta}_x} \quad 2\text{-}8$$

Note that A and B will always be defined if $\dot{\Delta}_x$ is fixed so that it is not a multiple of the resolution of $\dot{x}_o$ and $\dot{x}_i$.

Now consider three cases: $\dot{x}_i - \dot{x}_o + \dot{\Delta}_x < 0$, $-\dot{\Delta}_x - \dot{x}_i - \dot{x}_o < \dot{\Delta}_x$, and $\dot{x}_i - \dot{x}_o - \dot{\Delta}_x > 0$.

In the first case $(\dot{x}_i - \dot{x}_o + \dot{\Delta}_x < 0)$, $\dot{x}_i - \dot{x}_o - \dot{\Delta}_x$ also $< 0$; 2-6 and 2-6a become $B \leq t \leq A$ and $$t_{min\,1} = B, \quad 2\text{-}9$$
$$T_{max\,1} = A. \quad 2\text{-}10$$

In the second case $(-\dot{\Delta}_x < \dot{x}_i - \dot{x}_o < \dot{\Delta}_x)$, 2-6 and 2-6a become $A \leq t \leq B$, and $$t_{min\,1} = \max(A, B), \quad 2\text{-}11$$
$$t_{max\,1} = \infty \quad 2\text{-}12$$

If this case is divided into three subcases: $x_o - x_i < -\Delta_x$, $-\Delta_x < x_o - x_i < \Delta_x$, and $x_o - x_i > \Delta_x$, then from the following,

| Case | A | B | $t_{min\,1}$ |
|---|---|---|---|
| $x_o - x_i < -\Delta_x$ | − | + | B |
| $-\Delta_x < x_o - x_i < \Delta_x$ | − | − | − |
| $\Delta_x < x_o - x_i$ | + | − | A |

It is seen that the choice of A or B depends on $x_o - x_i$. In the middle subcase, it does not matter whether A or B is picked since both are negative and the effect of the choice will be masked out when inequality 2–3a is checked.

In the third case, $\dot{x}_i - \dot{x}_o - \dot{\Delta}_x > 0$, $\dot{x}_i - \dot{x}_o + \dot{\Delta}_x > 0$, and 2–6 and 2–6a become $A = t = B$, so $$t_{min\ 1} = A, \qquad 2\text{-}13$$
$$t_{max\ 1} = B. \qquad 2\text{-}14$$

Using 2–2 and 2–3 the same way, similar equations can be developed for $t_{min\ 2}$, $t_{max\ 2}$, $t_{min\ 3}$, and $t_{max\ 3}$. FIG. 13 shows the resulting algorithm for collision avoidance. This can be preformed in an associative processor in parallel (one aircraft $x_o, y_o, h_o$) against all others $(x_i, y_i, h_i)$. Since the most significant digits of the quotient are formed first in division, the quotient formation can be combined with the maximum and minimum operations in Boxes 1, 2, 3, and 4 in FIG. 13 and need not be explicitly stored. In general, some associative processor words will be in Box 1, others in Box 2, others in Box 3, and others in Box 4 simultaneously. The operations can be carried out simultaneously.

METHOD 3

Another method which will be evident to those skilled in the art develops the closest point of approach of one aircraft with another. This closest point of approach is obtained by evaluating the derivatives of the paths of the aircraft. Whenever a closest point of approach is less than a critical distance, corrective maneuvers are evaluated and commands issued as above.

METHOD 4

A further method similar to the above, evaluates the minimum separation along each of the coordinates established with respect to ones of the aircraft and uses such minimum to determine the possibility of collision. Appropriate maneuvers then take place.

CONTROLLER SECTOR OVERLOAD

FAA regulations limit the number of aircraft in one sector to a specified maximum value at any one time. As described above with reference to FIG. 2, the monitor section defines how the associative processor can be used to determine all the IFR aircraft within a given sector at some future time. The procedure for this operation extrapolates each aircraft in time along its flight path, and then searches within the boundary of each sector as a function of time to determine if more than the allowable number of aircraft will exist within any sector at any future time.

TERMINAL OVERLOAD

The extrapolation of all filed flight plans with modifications required in flight, as described above, will lead to an evaluation of aircraft arrival at each terminal area as a function of time. Terminal load handling capability can be evaluated on the basis of scheduled takeoffs and landings and predicted weather. Overload conditions, when established, can be corrected through evaluations of, and necessary modification to each flight plan. Consideration is given first to flights in the air and near the terminal, second to airborne flights far from the terminal, and third to flights on the ground. Such consideration involves slowdown or speedup (within limits) of airborne flights and delays at ramp for planned flights. A procedure of this kind permits minimum fuel costs and delays.

OVER OCEAN COLLISION AVOIDANCE AND CONTROL

Navigational satellites planned for some future time can provide for over ocean control with the same equipment used in overland, enroute, and terminal areas. The satellites can be either low or stationary orbit. The system envisioned for this type of overall system is shown in FIG. 14 of the drawings, and would have a ground station 100 which would discretely interrogate each aircraft and measure distance from at least two satellites 102 and 104. The system could measure aircraft rapidly using the trilateration approach of my above-identified application by using the air control centers 106 and 108, respectively. Ambiguities would be resolved by maintaining the track of each vehicle, while conflicts will be evaluated as described above. Avoidance maneuvers could be transmitted via a beacon satellite system or alternatively could be communicated by voice from ground station 100. This same type of satellite oriented system might also control navigational problems for ships 114 on a body of water 116.

WEATHER AND TERRAIN AVOIDANCE

It should also be understood that this type of system could plot weather 110 derived from weather observation sources and advise planes how to avoid same. The system could also plot terrain such as mountains 112 and tall structures 113 and average terrain elevation, and advise the respective aircraft to avoid these terrain features based on their plotted positions versus the aircraft's actual position.

Since severe weather which may adversely effect aircraft is bounded, areas of weather are defined by boundaries. Such boundaries are similar to the boundaries of a sector discussed above, and conflict with weather is established by extrapolating flight plans to determine if they intersect severe weather areas in a manner similar to the detection of sector overload.

Terrain avoidance is accomplished by establishing a grid structure in $x$ and $y$ say, every 5 miles. Thus, an area 100 × 100 miles would be a matrix of 20 × 20 or 400 positions. Within each position of the matrix would be inserted the maximum terrain elevation above sea level within the defined 5 × 5 mile area. Aircraft velocities are used to predict future position and altitude, and the aircraft position and altitude are compared with the matrix to determine if the aircraft is too near the terrain. If so, an up command is issued.

Intense weather formations could be stored in the associative processor as an area. Each aircraft when updated and checked for conflict with other aircraft would also be checked for intersection with hazardous weather areas by determining if the aircraft vector intercepted any described weather areas. Routing around weather would be suggested by the controller and the suggested change would be checked for conflict before transmission to the respective aircraft. The flight plan for the aircraft would be modified if necessary and inserted into the monitor section 46 of the associative processor.

SUMMARY

Hence, it is seen that the invention provides a method for rapid evaluation, decision and maneuver particularly designed for aircraft to avoid collisions. In the event of detection of a potential collision with another aircraft, a particular algorithm would control the operation of the associative processor to evaluate a fixed set of maneuvers in order of best maneuverability for the particular aircraft to determine an acceptable maneuver. Each maneuver would result in a new vector, and this vector would be evaluated against all other vectors to see if additional conflicts would occur. The most desirable maneuver that is safe would be indicated to the controller for his execution along with a display of the situation and necessary information about each of the aircraft. In the event an aircraft approaches too close to terrain, a pullup order would be indicated to the controller with information necessary to communicate with the aircraft. It must be remembered that in any case, the controller could be left out of the loop and the plane or planes involved could be directed by the computer.

On detection of conflict in flight plans, modification of the conflict can be resolved by operating with the standard procedure. Such procedure may start by delaying flights on the ground. An increase in departure time or other control situations would be utilized to find an acceptable take off time. An alternative would be to speed up or slow down involved aircraft which are airborne. The results of each of the flight plan modification would have to be evaluated by the monitor system shown in FIG. 2 to see that other conflicts did not arise. Conflicts in flight plan which did not result in terminal overload could be easily treated in the airborne case to achieve minimum cost and time.

The envisioned system preferably requires each aircraft to utilize a transponder of a type similar to those currently available to provide for coverage of all aircraft. If the satellite system is utilized, it likely would be less costly than the cost of one air to air collision. The satellite system could also provide for surface vessel conflicts. Minimum flight delays could be achieved, and minimum flight operational costs could be realized.

While in accordance with the patent statues, only the best known embodiment of the invention has been illustrated and described in detail, it is to be particularly understood that the invention is not limited thereto or thereby, but that the inventive scope is defined in the appended claims.

What is claimed is:

1. A method for effecting vehicle traffic control which comprises the steps of
   a. determining vehicle position information in $x$, $y$ and $h$ rapidly and accurately sequentially for each vehicle within a predetermined area with respect to a predetermined reference coordinate point,
   b. computing course and speed for all vehicles simultaneously on the basis of the position information determined by step (a),
   c. computing interrogation rate for all vehicles as a function of their position relative to predetermined points or their potential collision with other vehicles,
   d. determining course intersect positions and time for all vehicles with respect to each other related to the predetermined reference,
   e. determining the difference in arrival time of each of the vehicles at their respective intersect points,
   f. determining the minimum separation distance or closest point of approach of vehicles with respect to their positions and velocities,
   g. comparing the difference in all vehicle intersect times to a predetermined standard, and
   h. sending maneuvering instructions to all vehicles having intersect times within the predetermined standard so as to extend the intersect times outside the predetermined standard.

2. A method according to claim 1 where steps (d) though (g) are all performed simultaneously for one vehicle with respect to all other vehicles by an associative processor, and where such steps are simultaneously performed sequentially on all other vehicles.

3. A method according to claim 1 where each of steps (a) through (h) are continuously repeated for each vehicle within the predetermined area at not greater than 6 second intervals.

4. A method according to claim 1 where course and speed intersects for all vehicles are determined by
   i. defining each vehicle track in terms of slope with respect to an $x$, $y$ coordinate system with the predetermined reference at the $x$, $y$ zero point of the system,
   j. determining the potential $x$, $y$ coordinate of track intersect of each vehicle with respect to every other vehicle,
   k. determining the time when each vehicle is going to reach respective $x$, $y$ coordinate of track intersect,
   l. comparing to a predetermined time standard the time difference of each vehicle reaching its respective $x$, $y$ track intersect coordinate with the other vehicle for each intersect coordinate, and
   m. indicating which vehicles have track $x$, $y$ intersects where the time difference of intersect is less than the predetermined standard.

5. A method according to claim 4 which includes effecting a slope comparison of the track of each vehicle to determine if the vehicles are moving on substantially parallel, toward, away, diverging, or converging paths before accomplishing steps (j) through (m), and only effecting steps (j) through (m) on those vehicles whose slopes indicate parallel toward and converging courses.

6. A method according to claim 5 where the vehicles are aircraft and which includes effecting an altitude comparison to a predetermined minimum standard of those vehicles which indicate track intersect within the predetermined time standard and effected some collision warning signal and suggested maneuvering to the vehicle operator for those vehicles which will intersect within the predetermined altitude standard.

7. A method according to claim 1 where vehicle position information is determined by at least two satellites operating in coordinate relation to each other.

8. A method according to claim 1 which includes the step of predicting an overload of vehicles in the area as a whole, and at any specific locations within the area.

9. A method according to claim 8 where the vehicles are aircraft and which includes storing all filed IFR flight plans, comparing each IFR flight plan as it is filed with all previously filed IFR flight plans to determine potential future conflict, and comparing all changed and altered IFR flight plans to all filed IFR flight plans to determine potential future conflicts, and providing information in cases where potential future conflict is predicted to change flight plans or actual flight paths so as to avoid such conflict.

10. A method according to claim 8 which includes the steps of determining weather and terrain characteristics for the area, and evaluating and controlling the path of all vehicles in the area to avoid collision of the vehicles therewith.

11. A method to effect vehicle traffic control which comprises the steps of
   a. determining vehicle position information in $x$, $y$ and $h$ rapidly and accurately for vehicles within a predetermined area with respect to a predetermined reference coordinate point,
   b. simultaneously computing course and speed for all vehicles on the basis of repeated position information for all vehicles,
   c. sequentially computing whether vehicles will approach within a certain minimum distance of each other,
   d. sequentially computing alternate safe courses and/or speeds for all vehicles that have predicted approaches within the predetermined minimum distances, and
   e. sequentially sending maneuvering instructions to all such vehicles to make their approaches to all other vehicles fall outside the predetermined minimum standard.

12. A method according to claim 11 which includes
   determining vehicle vector intersect points,
   measuring the time difference of vehicle arrival at such intersect points and comparing it to a predetermined standard, and
   providing maneuvering instructions for those vehicles which indicated intersect within the predetermined standard.

13. A method according to claim 11 which includes determining the distances of the closest point of approach of each vehicle to each other vehicle based on their computed vector paths, comparing the determined distances to a predetermined standard, and providing maneuvering instructions for those vehicles which indicate distances within the predetermined standard.

14. Apparatus for effecting traffic control of vehicles which comprises,
   means to determine the position of all vehicles within a predetermined area,
   means to simultaneously determine potential conflicts of each vehicle with every other vehicle in the area,
   means to simultaneously predict a safe course to avoid potential conflicts between each vehicle whose path indicates a potential conflict without creating a conflict with any other vehicles, and to sequentially perform this step for every vehicle and means to pass potential conflict information to the vehicles and information to effect a change in path and/or speed to avoid the potential conflict.

15. Apparatus according to claim 14 where the means to simultaneously determine potential conflicts and simultaneously predict a safe course in an associative processor, and includes
a bulk store and monitor section interrelated to the processor to store filed vehicle plans and compare each plan as it is filed against all previously filed plans to determine future potential vehicle conflict and compare all filed vehicle plans against actual vehicle paths to determine future potential vehicle conflict.

16. Apparatus according to claim 14 which includes
a CRT display scope for a vehicle controller to visually observe the vehicle conflict picture, and means to selectively effect transfer of information from the controller to each vehicle.

17. Apparatus according to claim 14 which includes
a trilateration beacon system to determine vehicle position information within the predetermined area, and a back up radar system to obtain vehicle position information for all vehicles not responding to beacon, and
means to determine weather and terrain characteristics and effect vehicle control to avoid these.

* * * * *

UNITED STATES PATENT OFFICE
CERTIFICATE OF CORRECTION

Patent No. 3,668,403          Dated  June 6, 1972

Inventor(s)   Willard C. Meilander

It is certified that error appears in the above-identified patent and that said Letters Patent are hereby corrected as shown below:

Column 4, line 58, change "This" to --Thus--.

Column 6, line 42, after "radar" delete "99"; line 43, after "radar" insert --99--.

Column 7, line 56, equation in ( ) should be ($\alpha, \beta, \gamma$).

Column 9, line 18, before the word "bit" insert --busy--.

Column 10, line 30, change "$\dot{x}_p, \dot{y}_p,$ and $\ddot{h}_p,$" to --$x_p, y_p,$ and $h_p,$--; line 33, change "x, y, and h" to --$\dot{x}, \dot{y},$ and $\ddot{h}$,--.

Column 11, line 67, (2nd equation)

change " $\overline{x}_n = \overline{x}_n - 1$ " to -- $\overline{\dot{x}_n} = \overline{\dot{x}}_{n-1}$ --

Column 11, line 69, -(3rd equation)

change "$+ T \overline{\overline{x}_n}$" to --$T \overline{\dot{x}_n}$--.

Column 11, line 75, change "$\beta$" to -- $\alpha$ and $\beta$ --.

Column 12, line 55, change "5 3 3 2 1" to -- 5 4 3 2 1--.

Column 15, line 38, (equation 1-6)
change " $\pm \dot{h}_i t_c$ " to -- $\pm \dot{h}_i t_{c_i}$ --

Column 15, line 43,
change "where $h_c$" to --where $h_{c_T}$ --.

Column 16, line 62 (equation 2-10)
change "$T_{max}$" to -- $t_{max}$ --.

Signed and sealed this 6th day of February 1973.

(SEAL)
Attest:

EDWARD M. FLETCHER, JR.
Attesting Officer

ROBERT GOTTSCHALK
Commissioner of Patents